Patented May 16, 1950

2,507,729

UNITED STATES PATENT OFFICE 2,507,729

TITANIUM OXIDE PIGMENT PRODUCTION

Robert Myers McKinney, Wilmington, Del., assignor to E. I. du Pont de Nemours & Company, Wilmington, Del., a corporation of Delaware No Drawing. Application September 11, 1943, Serial No. 502,019

7 Claims. (Cl. 23—202)

This invention relates to titanium oxide pigment manufacture, and more particularly to the preparation of improved titanium oxide pigments adapted to exhibit, on X-ray analysis, substantially the rutile crystalline lattice.

More specifically, the invention relates to a novel nucleating agent useful for accelerating the hydrolysis of titanium salt solutions, and especially titanium sulfate, to obtain therefrom a novel type of anatase hydrolysate which will readily convert to rutile when calcined at temperatures of a relatively low order, e. g., below 1000° C. and within a temperature range of from about 750–950° C.

Titanium oxide occurs in three crystalline modifications, i. e., anatase, brookite and rutile. Although rutile has the highest refractive index and therefore the greatest potential hiding power, commercial $TiO_2$ pigments have been characteristically in the anatase crystalline pattern. This arises by reason of the fact that titanium sulfate solutions, from whence anatase is precipitated on hydrolysis, are more favored in industrial applications because more readily and economically prepared than are chloride solutions from whence rutile is ordinarily hydrolyzed, provided pure solutions are used and careful controls are effected over the pigment-producing operation. Thus, the more common titanium-bearing mineral, ilmenite, easily dissolves in sulfuric acid and the resulting sulfate solution is considerably less corrosive towards plant equipment than are the pure titanium chloride solutions and the exceedingly high temperatures which must be used in chlorinating the titaniferous ore. These and other difficulties inherent in chloride processes, especially problems of corrosion, have rendered chloride processes extremely unattractive and uneconomical for use in commercial production of rutile on a wide scale.

Rutile can also be prepared by converting anatase at high calcination temperatures, well in excess of 1000° C. The use of such excessive temperatures, however, entails an undesired sacrifice in the pigment properties of the final product, especially its tinting strength and color. As a consequence, such pigment degradation has likewise rendered this type of process non-suitable and unattractive for commercial exploitation in rutile pigment manufacture.

I have found that a high-quality rutile titanium oxide pigment relatively small and uniform in particle size and possessed of excellent tinting strength, color and hiding power characteristics, can be readily obtained from titanium salt solutions, and especially titanium sulfate, through use of a novel type of hydrolysis nucleating agent and calcination temperatures of a low order, well below substantially 1000° C. Accordingly, it is among the objects of this invention to provide for the production of such improved type of rutile pigment and through means of my novel type of nucleating agent. A further object of the invention is to provide a novel process for hydrolyzing a titanium sulfate solution in the presence of a novel type of nucleating or accelerating agent whereby one can obtain from such hydrolysis a type of anatase precipitate which will readily convert to rutile when calcined at temperatures normally employed in anatase pigment manufacture, i. e., from about 750–950° C. A further object of the invention is to provide a nucleating agent useful in titanium salt solution hydrolysis, and especially titanium sulfate, which will insure the production of highly increased yields of precipitated $TiO_2$ in said hydrolysis. Other objects and advantages of my invention will be apparent from the ensuing description thereof:

The foregoing and other objects are attainable in this invention which broadly comprises hydrolyzing a titanium salt solution in the presence of a nucleating agent obtained by decomposing a titanate, especially an alkali or alkaline earth metal titanate, in a slight excess of a monobasic acid medium, and then aging or conditioning the resulting acidified reaction product at an elevated temperature and in its mother liquor for a period of time sufficient to develop or activate the nucleating characteristics thereof.

In a more specific and preferred embodiment, the invention comprises hydrolyzing a titanium sulfate solution in the presence of a small amount of a nucleating agent obtained by decomposing barium titanate with a slight excess of hydrochloric acid, and then digesting or aging the resulting suspension at a temperature ranging from about 70–90° C. for a short period of time but sufficient in extent to activate the nucleating characteristics of said suspension.

In practically adapting the invention, I first prepare a suitable titanate, preferably barium titanate, by reacting a strong alkali, such as barium hydroxide, with a titanium-oxygen compound, preferably a $TiO_2$ hydrate precipitated from the hydrolysis of a titanium salt solution, such as titanium sulfate, and in accordance with, for example, the procedures of U. S. Reissue Patent 18,854. Such precipitates usually contain small amounts of adsorbed $H_2SO_4$ which I preferably remove prior to use by treating the same with an alkaline material which will yield a soluble sulfate. Thus, I conveniently react the hydrolysate with sufficient sodium or other alkali metal hydroxide as will combine with the sulfate radical present therein, and then wash the resulting product with water to remove any soluble sulfate formed. Alternatively, the $H_2SO_4$ may be removed by subjecting the $TiO_2$ to calcination treatment. This method is less preferred for use, however, due to the fact that a less reactive type of titanium product results and greater difficulty will be encountered in producing the desired titanate, especially from alkaline earth metal hydroxides.

After suitably purifying the $TiO_2$, I prepare my preferred barium titanate by reacting, in equimolecular amounts, an aqueous suspension of the desulfated hydrate with a solution of barium hydroxide, and effect said reaction by digestion at the boil until the reaction is completed. Thereupon and without removing the titanate from its mother liquor, I next digest the titanate while maintaining the same at an elevated temperature above 60° C. in a monobasic acid medium, preferably hydrochloric acid, using an amount of acid in the process which is in excess of that required to overcome the basicity of the alkaline earth metal oxide present in the titanate. I have found that it is critical to my invention that at least a slight excess of acid prevail in the digestion mixture and that said acid concentration must range from at least 0.1 N. to about 1.0 N., a preferred optimum range being from about 0.3 N. to 0.5 N. The slight excess of acid decomposes the acidified titanate reaction product and the titanium content thereof becomes converted into fine particles of rutile, the nucleating properties of which are suitably activated during the subsequent acid digestion at the contemplated elevated temperatures.

As indicated, the temperature to which the acidified product is subjected to develop the $TiO_2$ nuclei and also said rutile crystalline pattern must be in excess of 60° C. and may range to the boil (100° C.), but preferably ranges from 70° C. to 90° C. The duration of the digestion, aging or conditioning treatment can be varied somewhat and will depend upon the particular temperature used, the type and concentration of reactants employed, and the acidity of the suspension to be digested. Usually a time period ranging from about 10 minutes to 1 hour suffices for most practical purposes, and optimum results accrue when a temperature of about 80° C. is used and a digestion period of from about 15-30 minutes is resorted to.

The resulting monobasic acid-containing $TiO_2$ seed suspension can be used directly, after cooling, as a seeding agent in the conventional hydrolysis of a concentrated or dilute titanium sulfate solution, but preferably is first freed of the acid prior to use in said hydrolysis. Acid removal can be conveniently effected by neutralizing with an alkaline reagent, including alkali metal carbonates or hydroxides, such as those of sodium or potassium, as well as those of ammonium. Also useful in such neutralization are the alkaline earth metal hydroxides, particularly barium hydrate. This neutralization treatment is preferred because, advantageously, a flocculated, easily-filtered suspension is obtained at this stage of the process, thereby making it easy to remove soluble materials such as chlorides, which would cause corrosion of plant equipment and contamination of the final pigment product.

The amount of activated seed material used in the hydrolysis need be only relatively small or minor and in general may range from about 1 to 10%, or higher, a preferred amount being about 3 to 5%, said percentage amounts being on the basis of the $TiO_2$ present. After adding or otherwise incorporating the seeding agent in the titanium liquor, the nucleated solution is then heated to boiling to effect hydrolysis thereof in the usual and conventional manner, such heating being continued until substantially complete precipitation is effected. By reason of the presence of my novel seeding agent in said hydrolysis, a substantially increased high yield of precipitated $TiO_2$ will result within a relatively short period of time, and at the end of the hydrolysis the total $TiO_2$ yield will be in excess of 95%, as contrasted with a yield not exceeding 40% when an unseeded type of solution is used.

Following the hydrolysis, the raw pigment anatase $TiO_2$ is subjected to the usual washing and purification treatments, following which it is calcined at a temperature below substantially 1000° C. and preferably at a temperature ranging from 850-975° C. to produce my improved rutile pigment, and without recourse to the excessively high calcination temperatures which, in the absence of the use of my novel seeding agent, would be necessary to effect such rutile conversion and would result in a product of diminished pigment strength and color characteristics.

To a more complete understanding of my invention, the following specific examples are given, which are merely illustrative and are not to be construed as in limitation of my invention:

*Example I*

100 parts by weight of precipitated $TiO_2$ from the hydrolysis of a titanium sulfate solution is pulped in water and neutralized with sodium carbonate. The resulting sodium sulfate solution is then removed by filtration and washing, following which the desulfated titanium hydrate is digested at a temperature of 100° C. with a solution of barium hydrate containing an equivalent amount of this reagent (214 parts of $Ba(OH)_2$). After two hours digestion time at the boiling temperature, the reaction was found to be substantially complete, the product comprising a suspension of barium titanate in water containing about 115 grams of solids per liter. Without cooling, the suspension was added to a 20% hydrochloric acid solution which had been previously heated to a temperature of 80° C. The resulting suspension analyzed 30 grams $TiO_2$ per liter and showed a titratable acid content of about 20 grams HCl per liter. 30 minutes after completing the addition of the titanate suspension, the product was added to an equal amount of cold water and neutralization effected by the addition of the required amount of barium hydrate. The seed material was then filtered, washed to remove and recover the barium chloride and was then resuspended in water for use in the hydrolysis of titanium sulfate solution. It was found to be highly effective as a nucleating agent in such hydrolysis when using as little as 5% (5 parts of seed per 100 parts of $TiO_2$ in the sulfate solution) and conducting the sulfate hydrolysis at a concentration of 170 grams per liter. The recovered, washed hydrolysate, when calcined at a temperature of 950° C. for one hour, converted readily to rutile, to provide a product exhibiting about 20% better hiding power than commercial anatase pigment.

Example II

Example I was repeated with the substitution of two molecules of barium sulfide as a solution of 30° Baumé strength for each molecule of barium hydrate in the formation of the titanate. The barium hydroxide content of the sulfide solution reacted with the $TiO_2$ to give barium titanate and a solution of barium hydrosulfide. The latter was removed by filtration and the barium titanate was further processed as in Example I to obtain the seed nuclei suspension in hydrochloric acid. The barium hydrosulfide solution was used in neutralizing the hydrochloric acid before the final purification to remove chloride anions from the seed product. The hydrogen sulfide generated was removed with the usual precaution to avoid explosion and asphyxiation. The seed material was found equally effective in the hydrolysis of the titanium sulfate solution.

Example III

Titanium sulfate hydrolysate in the form of a washed hydrolysis filter cake was suspended in a solution of caustic soda using 12 parts of sodium hydroxide for each 10 parts of $TiO_2$. The resulting suspension was boiled for three hours after which it was cooled, filtered and washed to remove soluble sodium hydroxide and sodium sulfate. The filter cake was resuspended in water and heated to 85° C., in which condition it was ready for acidification which was accomplished by simultaneously adding the sodium titanate suspension and a substantial excess of a hydrochloric acid solution at a like temperature to a reaction vessel. The vessel had sufficient capacity to afford a 30-minute retention time and the overflow from the same was cooled by quenching by an equal volume of cold water. The quenched product was neutralized with sodium carbonate and washed to remove sodium chloride. The resulting seeding material possessed the crystal structure of rutile and was highly effective as a nucleating agent in the hydrolysis of titanium sulfate, the hydrolysate from which readily converted completely to rutile at a calcination temperature of 975° C.

Although raw $TiO_2$ from the practice of the present invention is preferred for producing the titanate, anatase raw pigment obtained from the hydrolysis of a titanium salt solution, in accordance with said U. S. Reissue Patent 18,854, as well as other $TiO_2$ hydrates, including hydrolysates from the processes of U. S. Reissue Patent 18,790 or U. S. Patent 2,062,133, are contemplated for use in preparing said titanate and my novel seeding agent. Similarly useful are orthotitanic acid precipitates resulting from the neutralization of a titanium salt solution, such as the chloride, nitrate, oxalate, etc., with a base or alkaline reacting material.

Furthermore, while my novel seeding agent is notably useful for accelerating the hydrolysis of titanium sulfate solutions to recover an anatase type of precipitate therefrom, which when calcined will readily convert to rutile, said seeding agent may also be used for accelerating the hydrolysis of titanium salt solutions generally, including the chloride, sulfate, nitrate, oxalate, etc.

Similarly, though I prefer to react a titanium hydrate with barium hydroxide or sulfide to obtain barium titanate as an intermediate for producing my nuclei, it is to be understood that said nuclei may be obtained from titanates generally and particularly from alkaline earth metal or alkali metal titanates, such as those of barium, strontium, and calcium, or sodium, potassium, lithium, etc. Hence, though I prefer to employ barium hydroxide for reaction with the titanium hydrate, other alkaline earth metal hydroxides can also be used and with satisfactory beneficial results. In general, barium, strontium, and calcium hydroxides, in aqueous solution or suspension, react with hydrous titanium oxide at a temperature within the range of from 70–140° C. to produce the corresponding titanate. Barium hydroxide being the most alkaline of the group does not require resort to the highest temperatures and the autoclave conditions are unnecessary for rapid reaction in the production of barium and strontium titanates.

As noted, the alkali metal hydroxides are also usefully employable in my invention for producing a desired alkali metal titanate. Thus, such alkali metal bases as those of sodium, potassium and lithium hydroxides react with the titanium oxide hydrolysate or hydrate to form the corresponding titanate. Alkali metal titanates are partially hydrolyzed in the presence of water, yielding a suspension of a titanate in the corresponding caustic solution. When digesting the hydrolysate from a titanium sulfate solution (containing adsorbed $H_2SO_4$) with sodium hydroxide, a suspension of sodium titanate in a solution of caustic soda and sodium sulfate is obtained. The solution may be removed by filtration and washing operations to yield a titanate ready for the subsequent step in the seed nuclei preparation. A large portion of the caustic is removed in this manner and the washed material will contain 4 to 6 parts by weight of $TiO_2$ for each part by weight of sodium hydroxide. The ratio of these components will vary with the conditions of preparation and the extent of washing, but I find that the preferred method of operation provides a product analyzing from 3.5 mols of $TiO_2$ for each mol of $Na_2O$.

The titanates are prepared as aqueous suspensions and these suspensions may be used without removal of water. Barium titanate does not require a filtration operation when made from barium hydrate and a titanium hydrolysate since there is no soluble reaction product. However, filtration is preferred where the titanate remains suspended in a solution of electrolyte, such as barium hydrosulfide, sodium sulfate, or sodium hydroxide. These solutes should be removed before acidification since this decreases the amount of acid necessary and also eliminates strong flocculating agents from the suspension at the time the nucleating properties are being developed.

Again, while I prefer to employ hydrochloric acid as the monobasic acid medium in which the titanate is to be decomposed and digested, other monobasic acids, including those of nitric, perchloric, hydrobromic, etc., may be used and with like beneficial results. The titanate suspension may be combined with the monobasic acid in a variety of ways, but I find that the best results are obtained by either adding the titanate slurry to the acid or simultaneously adding the slurry and the acid to a reaction vessel in which substantially constant reaction conditions are maintained. The temperature of the titanate suspension and the temperature of the acid may be so adjusted that when the two are combined as by simultaneous addition, the desired digestion temperature will be produced and such temperature may be then maintained for the desired length of time, following which it may be quenched with water or otherwise cooled in any desired manner.

Previously, methods for producing seed nuclei useful in the titanium sulfate solution hydrolysis to obtain precipitates adapted to convert to rutile, have required the use of titanium chloride solutions. Pure titanium chloride solutions are very difficult to prepare since they require the use of either anhydrous titanium tetrachloride or metathetical reaction of pure titanium sulfate solution with alkaline earth chloride solutions. The dissolution of raw pigment to form pure titanium sulfate solution requires an excess of sulfuric acid which must be neutralized in part and later precipitated as an alkaline earth sulfate, suitably, with barium chloride. The resulting chloride solution is relatively expensive and entails a complicated process in its production outlined.

In the present invention, I avoid the necessity of dissolving a portion of the raw pigment in acid to obtain the seeding material. As stated above, it is only necessary to digest a minor portion of the raw pigment, say, 3 to 5%, in a strong alkali, after which the resulting titanate is digested with a monobasic acid to obtain the seed material. These two digestion treatments enable one to convert an anatase sulfate hydrolysate into a rutile product, and when following the conditions specified, permit one to obtain a seed product which effectively aids in the production of a sulfate hydrolysate which converts to rutile at a low temperature to produce an excellent rutile pigment.

Furthermore, my process makes use of readily available raw materials since it employs strong alkali, such as barium hydroxide and sodium hydroxide. The former is available in the form of barium sulfide solution and 50% of the barium content of the latter is reactive with precipitated titanium oxide. The remaining half of the barium is removed as a solution of barium hydrosulfide and this compound is usable in the neutralization of the hydrochloric acid subsequently used in developing the nucleated properties. The barium is thereby converted to barium chloride and this may readily be converted to blanc fixe and hydrochloric acid which is reused in the system. Use of sodium hydroxide as the alkali has the advantage that the hydrolysate used for the seed production does not need to be desulfated as a separate operation, but is disadvantageous in that the hydrochloric acid is not recoverable. However, regardless of the selection of alkali, a simple type of process is had which affords substantial savings and economies when used.

I claim as my invention:

1. A process for obtaining rutile $TiO_2$ nucleating agent useful in titanium salt solution hydrolyses which comprises digesting an alkaline earth metal titanate at a temperature ranging from 60° C. to the boiling point in the presence of a 0.1–1.0 N. concentration of a monobasic acid which decomposes the acidified titanate and converts its $TiO_2$ content to rutile, and continuing said digestion for a sufficient length of time to develop the nucleating characteristics of the $TiO_2$ present in said titanate.

2. A process for obtaining an improved rutile $TiO_2$ nucleating agent for use in titanium liquor hydrolyses which comprises preparing an alkaline earth metal titanate by reacting a neutralized, purified titanium hydrate, while in aqueous suspension and at the boil, by digestion with an alkaline earth metal hydroxide, thereafter digesting the resulting alkaline earth metal titanate at a temperature ranging from 60° C. to the boiling point in a 0.1 N. to 1.0 N. concentration of a monobasic acid medium which decomposes the acidified titanate and converts its $TiO_2$ content to rutile, and continuing said digestion for a period ranging from about 10 minutes to 1 hour.

3. A process for producing a rutile $TiO_2$ nucleating agent useful in accelerating titanium solution hydrolyses which comprises reacting a strong alkaline earth metal hydroxide with a purified titanium hydrate recovered from a titanium solution hydrolysis, digesting the resulting alkaline earth metal titanate at a temperature ranging from 60° C. to the boiling point in a monobasic acid medium, the concentration of said monobasic acid being from 0.1 N. to 1.0 N. and in excess of that required to overcome the basicity of said titanate in order to decompose said titanate and convert its $TiO_2$ content to rutile, and then freeing the resulting reaction product of acid prior to use in said hydrolyses.

4. A process for obtaining a rutile $TiO_2$ nucleating agent useful in titanium solution hydrolyses which comprises reacting a strong alkaline earth metal hydroxide with a purified titanium hydrate recovered from a titanium solution hydrolysis, combining the resulting alkaline earth metal titanate with sufficient excess of a monobasic acid to yield an acid medium of from .1 to 1.0 N. and effect decomposition of said titanate and conversion of its $TiO_2$ content to rutile, and then maintaining the resulting mixture at a temperature ranging from 60° C. to the boiling point for a period of time sufficient to develop the nucleating characteristics of the $TiO_2$ present in said titanate.

5. A process for obtaining a rutile $TiO_2$ nucleating agent useful in titanium sulfate solution hydrolysis which comprises reacting a strong alkaline earth metal hydroxide with a purified $TiO_2$ hydrate, mixing the resulting alkaline earth metal titanate with sufficient hydrochloric acid to yield an acid medium having a concentration of from 0.1 N. to 1.0 N. HCl and effect decomposition of said titanate and conversion of its $TiO_2$ content to rutile, digesting the resulting mixture at a temperature ranging from 70° C. to 90° C., and continuing said digestion until the nucleating characteristics of the $TiO_2$ present in said mixture become activated.

6. A process for obtaining a rutile $TiO_2$ nucleating agent useful in titanium sulfate solution hydrolysis comprising mixing barium titanate, obtained by reacting barium hydroxide with an equimolecular amount of purified $TiO_2$ hydrate, with sufficient hydrochloric acid to yield an acid medium having a concentration of from 0.3 N. to 0.5 N. HCl and effect decomposition of said titanate and conversion of its $TiO_2$ content to rutile, and activating the nucleating characteristics of said titanium oxide by digesting the resulting mixture at a temperature of about 80° C. for a period ranging from 15–30 minutes.

7. A process for obtaining a rutile $TiO_2$ nucleating agent for titanium sulfate solution hydrolysis which comprises forming barium titanate by boiling together barium hydroxide and an equimolecular proportion of a desulfated $TiO_2$ hydrate, and then decomposing the resulting titanate and converting its $TiO_2$ content to rutile by digesting, at temperatures ranging from 60° minutes to one hour, said titanate in its mother liquor and sufficient excess hydrochloric acid to yield an acid medium having a concentration of from 0.1 N. to 1.0 N. HCl.

ROBERT MYERS McKINNEY.

REFERENCES CITED

The following references are of record in the file of this patent:

UNITED STATES PATENTS

| Number | Name | Date |
|---|---|---|
| 1,697,929 | Ryan | Jan. 8, 1929 |
| 1,922,328 | Rhodes | Aug. 15, 1933 |
| 2,029,881 | Little | Feb. 4, 1936 |
| 2,292,507 | Brooks | Aug. 11, 1942 |
| 2,301,412 | Keats et al. | Nov. 10, 1942 |
| 2,303,306 | Tillmann | Nov. 24, 1942 |

FOREIGN PATENTS

| Number | Country | Date |
|---|---|---|
| 149,316 | Great Britain | June 16, 1921 |
| 463,966 | Great Britain | Apr. 8, 1937 |
| 533,227 | Great Britain | Feb. 10, 1941 |

OTHER REFERENCES

Mellor, "Comprehensive Treatise on Inorganic and Theoretical Chemistry," vol. VII, page 39.